March 8, 1932. D. O. HELINE 1,848,717
EGG TRAY LIFTER
Filed Aug. 15, 1931  2 Sheets-Sheet 1
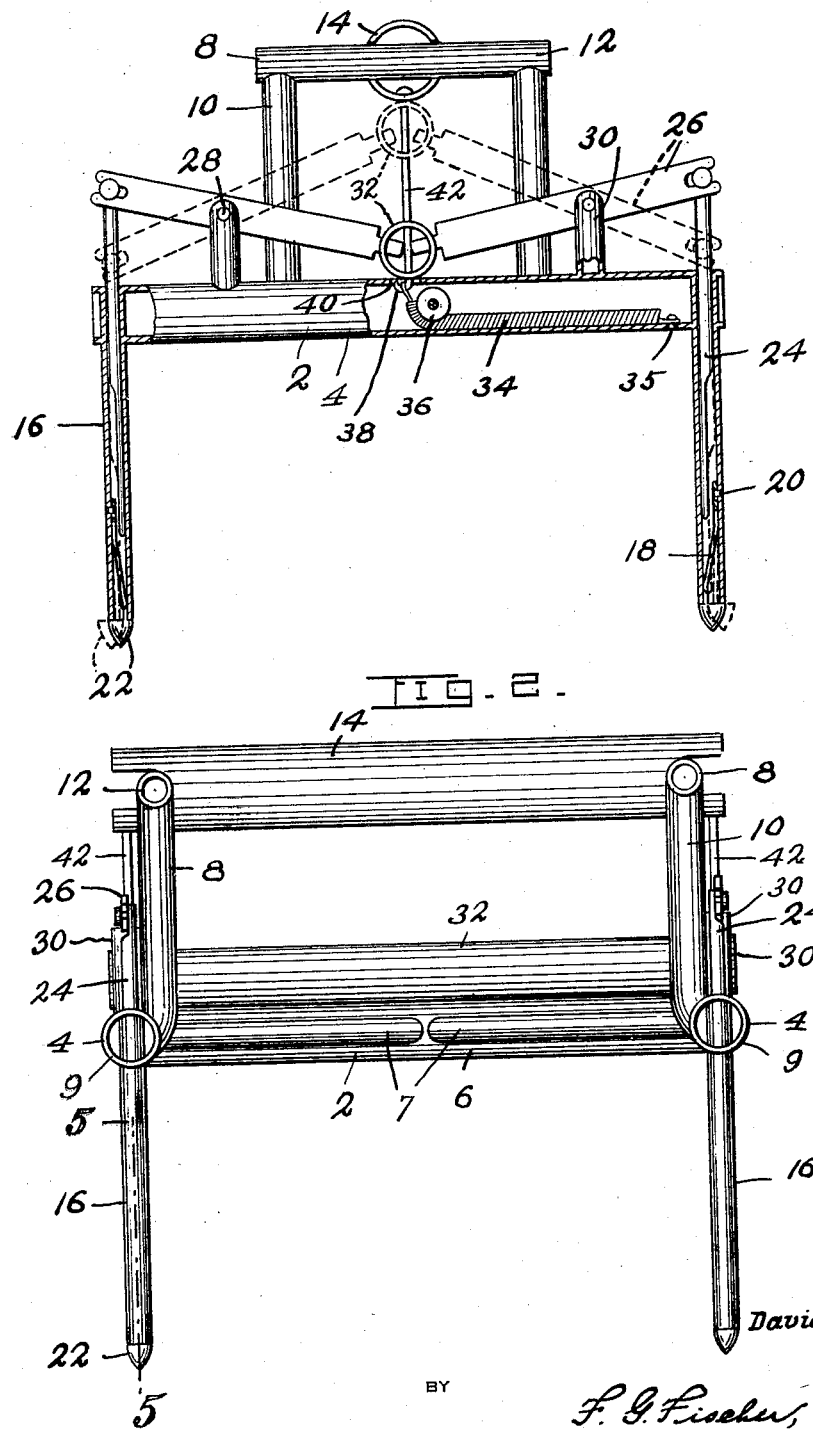
INVENTOR:
David O. Heline,
BY
F. G. Fischer,
ATTORNEY.

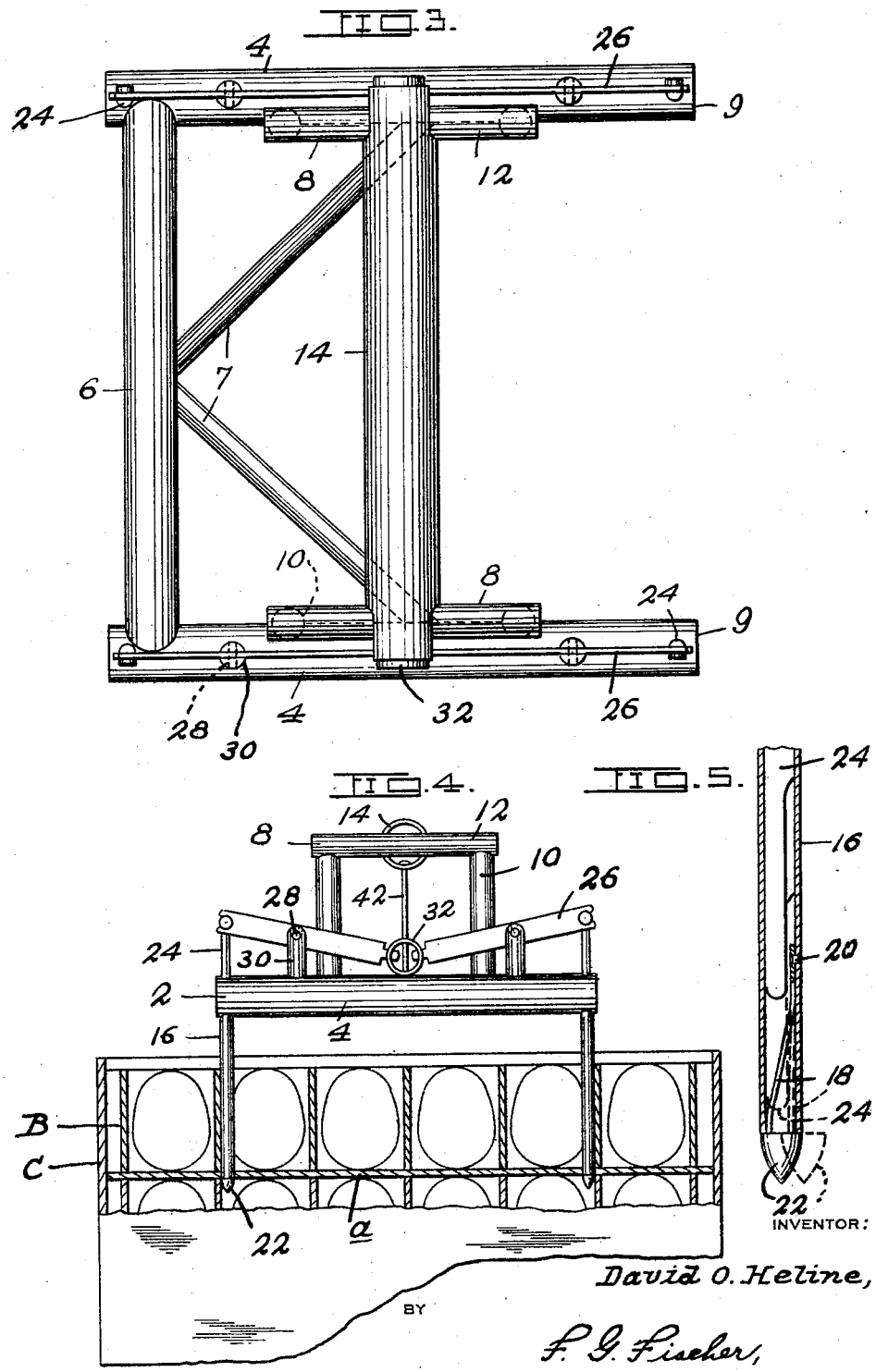

Patented Mar. 8, 1932

1,848,717

UNITED STATES PATENT OFFICE

DAVID O. HELINE, OF LINDSBORG, KANSAS

EGG TRAY LIFTER

Application filed August 15, 1931. Serial No. 557,224.

My invention relates to a device whereby trays containing eggs may be readily lifted from a shipping crate without danger of cracking or otherwise damaging said eggs and my object is to provide a new and useful device of this character which is simple in construction and well adapted for the purposes intended.

A further object is to provide a device of this character whereby the side walls of a tray may be lifted from the crate without removing the bottom of the tray upon which the eggs are resting.

In order that the invention may be fully understood, reference will now be had to the accompanying drawings, in which:

Fig. 1 is a front elevation of the device partly in section.

Fig. 2 is a side elevation of the device.

Fig. 3 is a plan view of the device.

Fig. 4 is a reduced front elevation of the device in position to lift an egg tray from a crate.

Fig. 5 is an enlarged broken sectional view taken on line 5—5 of Fig. 2.

Referring in detail to the different parts, 2 designates the main frame of the device which is U-shaped in plan and consists of a pair of longitudinal members 4 and a transverse member 6, which latter is rigidly connected at its ends to one end of each longitudinal member 4. Braces 7 extend from the central portion of the transverse member 6 to the intermediate portions of the longitudinal members 4 to reinforce the latter and prevent their free ends 9 from springing out of their normal position when the device is subjected to stresses such as occur when the device is in use.

8 designates an auxiliary frame surmounting the main frame 2 and consisting of upright members 10 and horizontal members 12. The upright members 10 are rigidly secured at their lower ends to the longitudinal members 4 of the main frame 2, while the horizontal members 12 are rigidly secured to the upper ends of said upright members 10.

14 designates a primary handle secured at its ends to the horizontal members 12 of the auxiliary frame 2 and whereby the device may be readily carried from place to place.

16 designates a plurality of tubular sheaths one of which is fixedly secured to each end of a longitudinal member 4. The sheaths 16 have internally arranged springs 18 fixedly secured at their upper ends to said sheaths by suitable means such as rivets 20 and provided at their lower ends with fixedly mounted spurs 22 preferably of conical configuration.

24 designates a plurality of plungers, one of which is reciprocably mounted in each sheath 16. The upper ends of the plungers 24 are operably connected to levers 26 each of which is fulcrumed at 28 upon a post 30. The posts 30 are fixedly mounted at their lower ends upon the longitudinal members 4 of the main frame 2.

The levers 26 are arranged in pairs and the adjacent ends of each pair are operably connected to a secondary handle 32, as best shown by Figs. 1 and 4. The secondary handle 32 is adapted to be manually raised and lowered, as will hereinafter appear, and is normally held in its lowermost position through the intermediary of a pair of contractile springs 34 arranged within the longitudinal members 4 of the main frame 2. Each spring 34 extends under a guide sheave 36 and is riveted or otherwise secured at one end to the respective longitudinal member 4 as indicated at 35 and attached at its opposite end to a hook 38 projecting from the secondary handle 32 through an aperture 40 in the upper portion of the respective member 4.

The secondary handle 32 is guided in its upward and downward movements by vertically-disposed guide members 42 suitably secured at their ends to the longitudinal members 4 and at their upper ends to the primary handle 14.

In practice the device is grasped by the primary handle 14 and the sheaths 16 are lowered into the corners of four cells of the topmost egg tray B in the shipping crate C until the spurs 22 reach the bottom a of said tray. Sufficient downward pressure is then exerted upon the handle 14 to force the spurs 22 and the lower ends of the sheaths 16 through said bottom *a* to the position disclosed by Fig. 4. The secondary handle 32 is then pulled upwardly towards the primary handle 14 as shown by dotted lines, Fig. 1, to rock the levers 26 upon their fulcrums 28 and thus cause said levers to force the plungers 24 downwardly against the springs 18 which are bent as shown on Figs. 1 and 5, to normally extend into the path of said plungers. As the plungers 24 move downwardly they cause the springs 18 to push the spurs 22 laterally as shown by dotted lines Fig. 5, so that said spurs will engage the underside of the bottom *a*, and lift the uppermost tray B when the device is lifted by the handles 32 and 14. While the device is being lifted with one hand the crate C can be held down if necessary by the other hand of the operator. After the upper tray B has been removed from the crate C as stated, it may be deposited at any desired point by releasing the secondary handle 32 which is then immediately drawn downwardly by the springs 34 and lifts the plungers 24 through the intermediary of the levers 26. As the plungers 24 move upwardly out of engagement with the springs 18 the latter restore the spurs 22 to normal position in axial alinement with the sheaths 16 so that said spurs may readily pass upwardly through the apertures which they formed in the bottom *a* of the tray B. The remaining trays in the crate C may then be removed one by one by repeating the operations above described.

In some instances it may be desirable to lift the side walls of a tray B and leave the bottom *a* with the eggs resting thereon in the crate C. This may be readily accomplished by lowering the device until the spurs 22 rest upon the bottom *a* and then forcing said spurs laterally, as above described, into engagement with the adjacent side walls with sufficient pressure to enable the tray to be lifted without its bottom *a*.

From the foregoing description, taken in connection with the drawings, it is apparent that I have provided a device which is well adapted for the purpose intended, and while I have shown one form of said device I reserve all rights to such other forms and modifications thereof as properly fall within the spirit and scope of the invention as claimed.

Having thus described my invention, what I claim and desire to secure by Letters Patent, is:

1. A device of the character described consisting of a suitable number of spurs adapted to be forced through the bottom of an egg tray, means for forcing said spurs laterally to a limited extent beneath said bottom after penetrating the same, and means for lifting said spurs while in such lateral position.

2. A device of the character described consisting of a suitable number of elements adapted to penetrate the bottom of an egg tray, suitably mounted sheaths beneath which said elements are disposed, spring means arranged in said sheaths to normally hold the elements directly beneath the sheaths, and means operably mounted in said sheaths for forcing said spring means laterally with said elements after the latter have penetrated the bottom of the egg tray.

3. A device of the character described consisting of a suitable number of elements adapted to penetrate the bottom of an egg tray, suitably mounted sheaths beneath which said elements are disposed, spring means for normally holding said elements directly beneath the sheaths, and plungers operably mounted in the sheaths and adapted to force said spring means laterally with said elements after the latter have penetrated the bottom of the egg tray.

4. A device of the character described consisting of a suitable number of elements adapted to penetrate the bottom of an egg tray, suitably mounted sheaths beneath which said elements are disposed, spring means for normally holding said elements directly beneath the sheaths, plungers operably mounted in the sheaths and adapted to force said spring means laterally with said elements after the latter have penetrated the bottom of the egg tray, and levers for actuating said plungers.

5. A device of the character described consisting of a suitable number of elements adapted to penetrate the bottom of an egg tray, suitably mounted sheaths beneath which said elements are disposed, spring means for normally holding said elements directly beneath the sheaths, plungers operably mounted in the sheaths and adapted to force said spring means laterally with said elements after the latter have penetrated the bottom of the egg tray, levers for actuating said plungers and a handle for actuating said levers.

6. A device of the character described consisting of a frame, sheaths depending from said frame, spurs normally arranged directly beneath said sheaths, means yieldably supporting said spurs, and suitably actuated plungers reciprocably mounted in said sheaths and adapted to force the spurs laterally from normal position.

7. A device of the character described consisting of a frame, sheaths depending from said frame, spurs normally arranged beneath and in alinement with said sheaths, spring means supporting said spurs, plungers reciprocably mounted in the sheaths and adapted to contact with said springs and force the spurs laterally to a limited extent, levers for actuating said plungers, and a handle for actuating said levers 8. A device of the character described consisting of a primary frame, sheaths depending from said frame, spurs normally arranged beneath and in alinement with said sheaths, spring means supporting said spurs, plungers reciprocably mounted in the sheaths and adapted to contact with said springs and force the spurs laterally to a limited extent, levers for actuating said plungers, a secondary handle for actuating said levers, an auxiliary frame mounted upon the primary frame, a primary handle secured to said auxiliary frame, and guide means for the secondary handle.

9. A device of the character described consisting of a U-shaped frame, braces for reinforcing said frame, members depending from said frame, penetrating elements yieldably supported beneath said depending members, and manually controlled means for forcing said penetrating elements laterally with respect to the depending members.

In testimony whereof I affix my signature.

DAVID O. HELINE.